(12) United States Patent
Aparimit et al.

(10) Patent No.: US 10,628,765 B2
(45) Date of Patent: Apr. 21, 2020

(54) PROJECT CHART WITH SOFT CONSTRAINT

(71) Applicant: Oracle International Corporation, Redwood Shores, CA (US)

(72) Inventors: Vaibhav Aparimit, Bangalore (IN); Manish Kumar, Bangalore (IN); Raghavan Srinivasan, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 232 days.

(21) Appl. No.: 14/330,044

(22) Filed: Jul. 14, 2014

(65) Prior Publication Data

US 2016/0012377 A1    Jan. 14, 2016

(51) Int. Cl.
*G06Q 10/06* (2012.01)
*G06Q 10/10* (2012.01)

(52) U.S. Cl.
CPC . *G06Q 10/063114* (2013.01); *G06Q 10/0631* (2013.01); *G06Q 10/06313* (2013.01); *G06Q 10/063118* (2013.01); *G06Q 10/103* (2013.01)

(58) Field of Classification Search
CPC ....... G06Q 10/063114; G06Q 10/0631; G06Q 10/063118; G06Q 10/103; G06Q 10/06313
USPC ...................................... 705/7.15
See application file for complete search history.

(56) References Cited

U.S. PATENT DOCUMENTS

| | | | |
|---|---|---|---|
| 4,700,318 A * | 10/1987 | Ockman | G06Q 10/06 345/595 |
| 5,351,195 A | 9/1994 | Sherman | |
| 6,023,702 A | 2/2000 | Leisten et al. | |
| 6,571,215 B1 * | 5/2003 | Mahapatro | G06Q 10/06 705/7.12 |
| 6,678,671 B1 | 1/2004 | Petrovic et al. | |
| 7,035,809 B2 | 4/2006 | Miller et al. | |
| 7,184,962 B2 | 2/2007 | Kalnas et al. | |

(Continued)

FOREIGN PATENT DOCUMENTS

| | | |
|---|---|---|
| EP | 1306786 A3 | 1/2004 |
| WO | 2001029663 A1 | 4/2001 |

(Continued)

OTHER PUBLICATIONS

Pertmaster Project Risk Software Specification Sheet. Pub. Date: Dec. 4, 2003. Retrieved from http://web.archive.org/web/20031204133829/http://pertmaster.com/docs/PertmasterSpecSheet.pdf. 2 pgs.*

(Continued)

*Primary Examiner* — Timothy Padot
(74) *Attorney, Agent, or Firm* — Potomac Law Group, PLLC (57) ABSTRACT

A system is provided that visualizes soft constraints among tasks. The system displays a chart within a user interface, where the chart includes a timeline including one or more time units. The system further displays task indicators that correspond to tasks within the timeline of the chart. The system further determines a soft constraint among a first task and a second task of the tasks. The system further displays a soft connector that corresponds to the soft constraint within the timeline of the chart, where the soft connector connects a first task indicator that corresponds to the first task with a second task indicator that corresponds to the second task.

19 Claims, 5 Drawing Sheets

(56) References Cited

U.S. PATENT DOCUMENTS

| | | | |
|---|---|---|---|
| 7,505,998 B2 | 3/2009 | Barrett | |
| 7,976,311 B2 | 7/2011 | Bantz et al. | |
| 8,306,841 B2 | 11/2012 | Clarke | |
| 8,311,865 B2 | 11/2012 | Vogel et al. | |
| 8,386,286 B2 | 2/2013 | Srinivas et al. | |
| 8,484,060 B2 | 7/2013 | D'Andrea et al. | |
| 8,510,230 B2 | 8/2013 | John et al. | |
| 8,517,742 B1 | 8/2013 | Johnson et al. | |
| 8,543,438 B1 | 9/2013 | Fleiss | |
| 8,560,364 B2 | 10/2013 | Vogel et al. | |
| 8,560,365 B2 | 10/2013 | Friedlander et al. | |
| 8,583,465 B1 | 11/2013 | Isamat et al. | |
| 8,595,044 B2 | 11/2013 | Bernardini et al. | |
| 2003/0126141 A1 | 7/2003 | Hassman et al. | |
| 2004/0002887 A1 | 1/2004 | Fliess et al. | |
| 2004/0017400 A1 | 1/2004 | Ly et al. | |
| 2005/0004828 A1 | 1/2005 | deSilva et al. | |
| 2005/0165930 A1 | 7/2005 | Whitman | |
| 2006/0004618 A1 | 1/2006 | Brixius | |
| 2006/0044307 A1* | 3/2006 | Song | G06Q 10/06 345/419 |
| 2006/0089920 A1 | 4/2006 | Ramesh et al. | |
| 2006/0177041 A1 | 8/2006 | Warner et al. | |
| 2006/0224259 A1 | 10/2006 | Buil et al. | |
| 2007/0005414 A1 | 1/2007 | Connors et al. | |
| 2007/0150327 A1 | 6/2007 | Dromgold | |
| 2008/0109740 A1 | 5/2008 | Prinsen et al. | |
| 2008/0172625 A1 | 7/2008 | Montgomery | |
| 2008/0183538 A1 | 7/2008 | Hamadi et al. | |
| 2008/0192056 A1 | 8/2008 | Robertson et al. | |
| 2008/0195452 A1* | 8/2008 | Ponce de Leon | G06Q 10/06 705/7.12 |
| 2009/0070363 A1 | 3/2009 | Bull et al. | |
| 2009/0076878 A1 | 3/2009 | Woerner et al. | |
| 2009/0199113 A1 | 8/2009 | McWhinnie et al. | |
| 2009/0222310 A1 | 9/2009 | Vollmer et al. | |
| 2009/0234699 A1 | 9/2009 | Steinglass et al. | |
| 2010/0138268 A1* | 6/2010 | Guo | G06Q 10/06 705/7.11 |
| 2010/0162152 A1 | 6/2010 | Allyn et al. | |
| 2010/0305994 A1 | 12/2010 | Gaskell | |
| 2011/0125539 A1* | 5/2011 | Bollapragada | G06Q 10/043 705/7.12 |
| 2011/0153379 A1 | 6/2011 | Toba et al. | |
| 2011/0208557 A1 | 8/2011 | Gonzalez Diaz et al. | |
| 2011/0307413 A1 | 12/2011 | Dutta et al. | |
| 2012/0116835 A1 | 5/2012 | Pope et al. | |
| 2012/0130907 A1 | 5/2012 | Thompson et al. | |
| 2012/0215578 A1 | 8/2012 | Swierz, III et al. | |
| 2012/0306887 A1 | 12/2012 | Mohammad et al. | |
| 2013/0144679 A1* | 6/2013 | Burnett | G06Q 10/0631 705/7.27 |
| 2013/0159197 A1 | 6/2013 | Singh et al. | |
| 2013/0246110 A1 | 9/2013 | Nakhayi Ashtiani et al. | |
| 2014/0114874 A1 | 4/2014 | Nelson et al. | |
| 2016/0027193 A1 | 1/2016 | Schiffer et al. | |

FOREIGN PATENT DOCUMENTS

| | | |
|---|---|---|
| WO | 2002082335 A2 | 10/2002 |
| WO | 2008105772 A1 | 9/2008 |

OTHER PUBLICATIONS

U. Beißert, M. König and H.-J. Bargstädt, "Soft Constraint-based simulation of execution strategies in building engineering", Journal of Simulation, vol. 4, pp. 222-231, 2010.*

Available views, http://office.microsoft.com/en-us/project-help/available-views-HP010210179.aspx, last downloaded Nov. 18, 2014, p. 1.

Niladri De et al., U.S. Appl. No. 13/776,747, filed Feb. 26, 2013.

Absenteeism and Staff Retention, http://www.hrinz.org.nz/Site/Resources/Knowledge_Base/A-H/Absentism.aspx, last downloaded Feb. 12, 2014, p. 1-3.

Activ Absence Control, http://assets-production.govstore.service.gov.uk/Gii%20Attachments/06b%20Cats%20-%20uploaded/G2.176%20-%20METHODS%20CONSULTING%20LTD/Archive1/B2%20Activ%20Absence%20Control%20Brochure%201210.pdf, last downloaded Jun. 2, 2014, p. 1-8.

Dr. Ahmed Sameh et al., "SE 503 Advanced Project Management", http://www.google.co.in/url?sa=t&rct=j&q=&esrc=s&source=web&cd=16&ved=0CEwQFjAFOAo&url=http%3A%2F%2Finfo.psu.edu.sa%2Fpsu%2Fcis%2Fasameh%2FSE503%2FC-Chain3.PPT&ei=1rcFU5v9AcfprQfBnoHYDw&usg=AFQjCNH2FF1dCMrnt2Q6wWFcsf42NATIkA&bvm=bv.61725948,d.bmk&cad=rja, last downloaded Jun. 2, 2014, p. 1-22.

Assigning Resources to Tasks, http://publib.boulder.ibm.com/infocenter/ratportm/v7r1m1/index.jsp?topic=/com.ibm.help.doc/assigning_resources.html, last downloaded Jun. 2, 2014, p. 1-5.

CA Clarity PPM, Functional Overview of the CA Clarity Project and Portfolio Management System, http://www.ca-clarity.com/cms/upload/EN/pdf/CA_Clarity_Functional_Overview.pdf, last downloaded Jun. 2, 2014, 40 pages.

Calculating Absenteeism, Retention & Turnover, https://www.gnb.ca/0012/Womens-Issues/wg-es/tools/pdf/hr_calc-e.pdf, last downloaded Jun. 2, 2014, p. 1-3.

Controlling the Uncontrollable—How Return-to-Work Programs Reduce Costs and Boost Productivity, http://research.prudential.com/documents/rp/127974_RTW_WP_r2.pdf, last downloaded Jun. 2, 2014, 11 pages.

Eric Uyttewall, "Dynamic Scheduling with Microsoft Project 2002", J. Ross Pub; 1 edition (Apr. 2003), p. 435.

Employee Scheduling & Human Resource Planning, http://www.mjc2.com/employee-scheduling-software.htm, last downloaded Jun. 2, 2014, p. 1-3.

ERP Software 360, "Assembling the Right Project Team", http://www.erpsoftware360.com/project-team.htm, last downloaded Jun. 2, 2014, p. 1-4.

Gantt Project, http://sourceforge.net/p/ganttproject/feature-requests/383/, last downloaded Jun. 2, 2014, p. 1-2.

GanttPV, http://www.pureviolet.net/ganttpv/, last downloaded Jun. 2, 2014, p. 1-3.

Software Selection Whitepapers, "Software Selection Getting Started Project Teams", http://www.software4distributors.com/media/whitepapers/BSWC_Software_Selection_Project_Teams.pdf, last downloaded Jun. 2, 2014, p. 1-13.

Bevan et al., "How Employers Manage Absence", Institute for Employment Studies—IES, Mar. 2004, http://www.employment-studies.co.uk/pubs/summary.php?id=err25, last downloaded Jun. 2, 2014, p. 1-6.

Harvey Levine, "How to Allocate Resources and Build Optimal Teams", http://www.attask.com/wp-content/uploads/2011/07/ART-How-to-Allocate-Resources-and-Build-Optimal-Teams.pdf, last downloaded Jun. 2, 2014, p. 1-5.

IBM Rational Portfolio Manager, "Project Staffing", http://publib.boulder.ibm.com/infocenter/ratportm/v7r1m1/index.jsp?topic=/com.ibm.help.doc/project_staffing.html, last downloaded Jun. 2, 2014, p. 1-3.

NetSuite Open Air, "Resource Management", http://www.openair.com/Resource-Management, last downloaded Jun. 2, 2014, p. 1.

Planning planet, "Network Diagram/Logic Diagram Cluttered and Unreadable," http://www.planningplanet.com/forums/planning-scheduling-programming-discussion/535990/network-diagram-logic-diagram-cluttered-and, last downloaded Jun. 2, 2014, p. 1-8.

The Omni Group, "OmniPlan Manual", Version 1.0, (2000-2009), p. 1-84.

Oracle Common Application Calendar User Guide, "Oracle Assignment Manager", Release 12.1, Part No. E13407-04, http://docs.oracle.com/cd/E18727_01/doc.121/e13407/T87077T87097.htm, last downloaded Jun. 2, 2014, p. 1-16.

Oracle Data Sheet, "Oracle's Primavera P6 Enterprise Project Portfolio Management", (2013) p. 1-4.

(56) References Cited

OTHER PUBLICATIONS

Oracle Projects Fundamentals, "Project Team Definition", Release 12.1, Part No. E13581-04, http://docs.oracle.com/cd/E18727_01/doc.121/e13581/T181945T284438.htm, last downloaded Jun. 2, 2014, p. 1-17.
Kronos, White Paper, "Out Sick: How to Minimize the Impact of Unplanned Absences in the Energy Industry", Reduce Costs and Increase Productivity with an Automated Absence Management Solution, http://www.kronos.com/ads/field/49/Kronos_field_ad.pdf, last downloaded Jun. 2, 2014, p. 1-8.
Assessments.biz, "Profiles Team Analysis Corporate Team Building Tools", http://assessments.biz/corporate-team-building.asp, last downloaded Jun. 2, 2014, p. 1-2.
Project insight, "Resource Allocation in Project Management Software", http://www.projectinsight.net/project-management-software/features/resource-allocation-in-project-management-software.aspx, last downloaded Jun. 2, 2014, p. 1.
Daptiv, "Project Management Office (PMO) Software", http://www.daptiv.com/solutions/daptiv-for-the-pmo.htm, last downloaded Jun. 2, 2014, p. 1-4.
Anonymous as per GECCO double blind submission rules, "Search-based techniques for optimizing software project resource allocation", http://www0.cs.ucl.ac.uk/staff/m.harman/icsm05b.pdf, Jan. 19, 2004, p. 1-11.
TeamSeer, "Smart absence and holiday management software that really saves you time", http://media.teamseer.com/downloads/TeamSeer_brochure.1.pdf, last downloaded Jun. 2, 2014, p. 1-9.
TeamGantt, "View Resource Availability Inside your Gantt Charts!", http://teamgantt.com/blog/2012/10/16/view-resource-availability-inside-your-gantt-charts/, last downloaded Jun. 2, 2014, p. 1-3.
Microsoft Office Team Planner, "View your team's work with Team Planner", http://office.microsoft.com/en-in/project-help/view-your-team-s-work-with-team-planner-HA010373239.aspx, last downloaded Jun. 2, 2014, p. 1-3.
Tenrox by upland, Project Workforce Management Software—PWM Software, "Resource Management Module", Manage Resources and Schedules across the Entire Organization—and Beyond, http://www.tenrox.com/en/solutions/project-worforce-management-resource-management-module.htm, last downloaded Jun. 2, 2014, p. 1-7.
Wang, et al., "Three-dimensional gantt chart based resource-constrained multiple projects scheduling and critical chain identification", 2011 IEEE 18th International Conference on Industrial Engineering and Engineering Management (IE&EM) vol. Part 3, No., pp. 1597,1601, Sep. 3-5, 2011.
Wikipedia, "Gantt chart", http://en.wikipedia.org/wiki/Gantt_chart, last visited May 1, 2014, p. 1-3.
Vaibhav Aparimit et al., U.S. Appl. No. 14/293,373, filed Jun. 2, 2014.
Vaibhav Aparimit et al., U.S. Appl. No. 14/302,483, filed Jun. 12, 2014.
Vaibhav Katkar et al., U.S. Appl. No. 14/315,576, filed Jun. 26, 2014.
Vaibhav Aparimit et al., U.S. Appl. No. 14/326,538, filed Jul. 9, 2014.
Jamagan, Harry W., "Planning/Control of Professional Staff Resources," 2004 AACE International Transactions PM.01, 2004.

\* cited by examiner

PROJECT CHART WITH SOFT CONSTRAINT

FIELD

One embodiment is directed to a computer system, and more particularly, to a computer system that displays data.

BACKGROUND

A project can include many tasks, where a task generally refers to an activity to be performed. There are often situations when organizations are required to perform multiple related tasks, for example, as part of a project. The tasks may be related based on an overall objective, and may be required to be performed in sequence, in parallel, etc., for meeting the overall objective.

Resources are often used (or consumed) in the performance of the tasks. Resources generally refer to any people, goods, places, etc., required for the performance of tasks. A single resource can be used to perform multiple tasks. Such a resource can be identified as a shared resource.

SUMMARY

One embodiment is a system that visualizes soft constraints among tasks. The system displays a chart within a user interface, where the chart includes a timeline including one or more time units. The system further displays task indicators that correspond to tasks within the timeline of the chart. The system further determines a soft constraint among a first task and a second task of the tasks. The system further displays a soft connector that corresponds to the soft constraint within the timeline of the chart, where the soft connector connects a first task indicator that corresponds to the first task with a second task indicator that corresponds to the second task.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

According to an embodiment, a visual soft constraint system is provided that visually displays a project that includes one or more tasks, and that visually displays "soft constraints" among multiple tasks, where a "soft constraint" is a constraint that can be relaxed, such as a resource interdependency. The visual resource allocation system can display a Gantt chart within a user interface, where the Gantt chart includes the tasks of the project. Further, the visual soft constraint system can extend the functionality of, and the visual information contained within, the Gantt chart by displaying "soft connectors" within the Gantt chart, where a "soft connector" is an indicator that represents a soft constraint. By displaying soft connectors, the visual soft constraint system can provide a visualization of an impact of a delay of tasks based on a soft constraint among the tasks, such as a shared resource working on both of the tasks. This can allow a project manager to more completely understand the soft constraints that impact an end date and/or time of tasks, such as a resource dependency of two tasks on the same resource (i.e., a resource interdependency).

Figure 1:
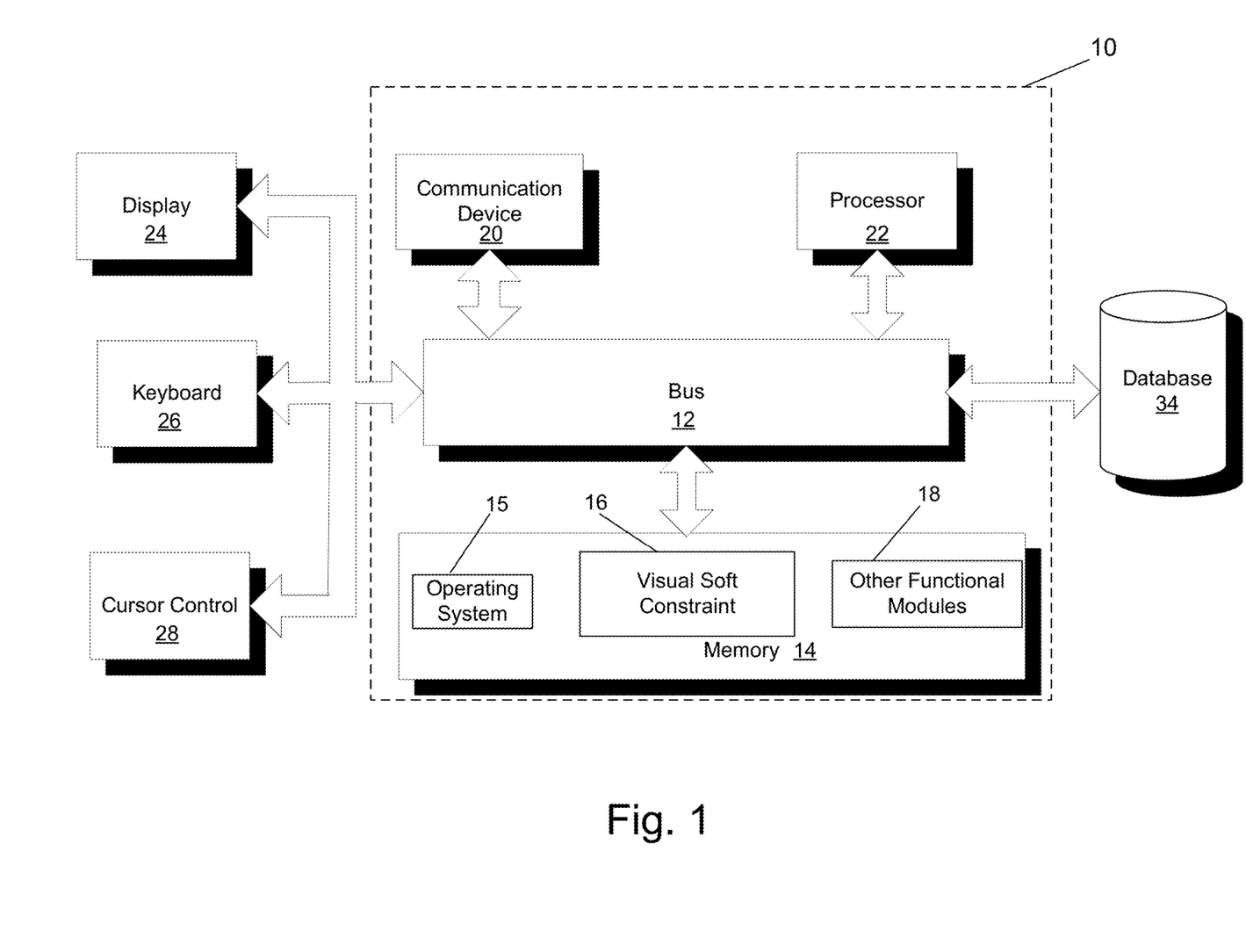
FIG. 1 illustrates a block diagram of a system that can implement an embodiment of the invention.

FIG. 1 illustrates a block diagram of a system 10 that can implement one embodiment of the invention. System 10 includes a bus 12 or other communications mechanism for communicating information between components of system 10. System 10 also includes a processor 22, operatively coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. System 10 further includes a communication device 20, such as a network interface card or other communications interface, to provide access to a network. As a result, a user may interface with system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with system 10.

According to one embodiment, memory 14 can store software modules that may provide functionality when executed by processor 22. The modules can include an operating system 15, a visual soft constraint module 16, as well as other functional modules 18. Operating system 15 can provide an operating system functionality for system 10. Visual soft constraint module 16 can provide functionality for visualizing soft constraints among tasks, as further disclosed below. In certain embodiments, visual soft constraint module 16 can comprise a plurality of modules, where each module provides specific individual functionality for visualizing soft constraints among tasks. System 10 can also be part of a larger system. Thus, system 10 can include one or more additional functional modules 18 to include the additional functionality. For example, functional modules 18 may include modules that provide additional functionality, such as functionality of a "Primavera Enterprise Project Portfolio Management" by Oracle Corporation.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

As previously described, a project can include many tasks, where a task generally refers to an activity to be performed. A Gantt chart is a useful way of showing tasks, activities, or events displayed against time, and a Gantt chart is commonly used in project management. Along a top portion of a typical Gantt chart is a suitable time scale that is based on a suitable time unit (such as a day, a month, a year, etc.). Each task is represented by a bar, or some other type of indicator, that is displayed within a portion of the Gantt chart. A position and width of the bar collectively indicate a start date-time (i.e., date and/or time) of the task, a duration of the task, and an end date-time of the task. This can allow a user of the Gantt chart to identify: (1) what the various tasks are; (2) when each task begins and ends; (3) how long each task is scheduled to last; (4) where tasks overlap with other tasks, and by how much; and (5) the start date-time and end date-time of the overall project. The bars in a Gantt chart typically illustrate the start date-times and end date-times of respective tasks against a time scale, where the width of the bar is typically proportional to the duration of the task, and the height of the bar is typically constant for all tasks. For a complex project, a Gantt chart can include many bars, and can be very complicated.

Further, two tasks within a project can be connected by an interdependency. An example of an interdependency is a task interdependency, where a start or finish of a successor task is dependent on a start or finish of a predecessor task. An example of a task interdependency is a "finish-to-start" interdependency, which indicates that a successor task can only start if a predecessor task finishes. A task interdependency is also identified as a "hard constraint," as there is generally no way to relax the constraint (such as allocating more resources to one or both of the tasks). Further, task interdependencies can be shown or displayed within a Gantt chart as "connectors," where a "connector" is an indicator that represents a task interdependency, and that can be visually displayed within the Gantt chart. An example of a connector is a solid line between two bars, or other type of indicators, that represent two tasks. By displaying connectors within a Gantt chart, or other type of display, a system can allow a project manager to more easily visualize an impact of a delay of one task on another task based upon a task interdependency.

Two tasks within a project can be connected by another type of interdependency, where a delay of a first task can delay a second task. An example of such an interdependency is a resource interdependency, where a single resource (i.e., a shared resource) is working on both tasks. For example, resource R1 can be scheduled to work on Task A from February 10 to February 15, and resource R1 can also be scheduled to work on Task B from February 16 to February 20. While these tasks have no task interdependencies, a delay of Task A can result in a delay of Task B, because resource R1 is scheduled to work on both Task A and Task B, and resource R1 cannot start Task B until it has finished Task A. Thus, Tasks A and B are connected by a resource interdependency. A resource interdependency is also identified as a "soft constraint." Generally, soft constraints can be relaxed by taking a mitigating action (such as allocating more resources to one or both of the tasks), and thus, are distinct from hard constraints.

Gantt charts are typically used by project managers for task planning purposes. Gantt charts can assist in easily generating a visualization of critical paths in a project. A critical path is a path that includes a set of tasks connected by interdependencies, where the path spans across a timeline of a project. A Gantt chart can also display task interdependencies between multiple tasks to indicate delay of any tasks based on other connected tasks. As previously described, task interdependencies are hard constraints because there is typically no way to relax these constraints. Gantt charts typically only display task interdependencies, and typically do not display other types of interdependencies or constraints, such as resource interdependencies, even though other types of interdependencies or constraints may result in a delay of a task.

In accordance with an embodiment, and as is described below in greater detail, resource interdependencies can be shown or displayed within a Gantt chart as "soft connectors," where a "soft connector" is a specific type of indicator that represents a resource interdependency, and that can be visually displayed within the Gantt chart. An example of a soft connector is a dashed line between two bars, or other type of indicators, that represent two tasks. By displaying soft connectors within a Gantt chart, or other type of display, a visual soft constraint system can allow a project manager to more easily visualize an impact of a delay of one task on another task based upon a resource interdependency. Further, in accordance with the embodiment, and as is also described below in greater detail, a soft connector can only be displayed within the Gantt chart when there is a probable risk that a delay of a predecessor task will impact an end date-time of a successor task.

In project management, a project manager typically has the following tools available to perform task planning: (1) a Gantt chart; and (2) one or more resource allocation charts. A Gantt chart, as previously described, typically represents a task as a horizontal bar, or some other type of indicator, on a time scale, where a width of the horizontal bar represents a duration of the task. A Gantt chart also typically visually indicates one or more critical paths in a project by highlighting the critical tasks in red. However, a Gantt chart typically does not visually indicate any information about whether a resource is assigned to a task or not. Further, a Gantt chart typically does not provide a way for a user to reallocate resources among tasks. Thus, to get a more complete understanding of the project, a project manager typically has to consult one or more resource allocation charts to identify information regarding resource, such as whether a delay is caused by a shared resource (i.e., if a shared resource is assigned to both a current task and a delayed task). A resource allocation chart typically displays an allocation of a resource over a time scale, such as a day. This indicates all the tasks that the resource is working on. However, the resource allocation chart typically only shows information about a specific resource. Thus, there is no easy way of viewing multiple existing resource relationships for different tasks of a project within the resource allocation chart. Also, the resource allocation chart typically does not allow managing attributes of a task, such as impact of delay, different interdependencies for impacted tasks, etc. Thus, a project manager typically has to frequently switch between a Gantt chart and a resource allocation chart to effectively plan tasks and allocate resources.

Thus, according to an embodiment, a visual soft constraint system can solve the aforementioned problem by extending the functionality of a Gantt chart to visualize "soft constraints" between tasks, where soft constraints can include resource interdependencies between tasks (i.e., the same resource performs the tasks). The visual soft constraint system can display "soft connectors" within a Gantt chart, where the soft connectors represent the soft constraints. The visual soft constraint system can further display each soft connector using a first color (e.g., blue) or a second color (e.g., red) based on a possible incidence of a critical path due to the soft constraints. Such information can be displayed within the Gantt chart, so a project manager does not have to resort to switching between the Gantt chart and a resource allocation chart in order to identify such soft constraints. The visual soft constraint system can further set a maximum delay allowed in a task to enforce a soft constraint condition, so that the Gantt chart is not unnecessarily cluttered with soft connectors. The functionality of the visual soft constraint system is further described below in greater detail.

Figure 2:
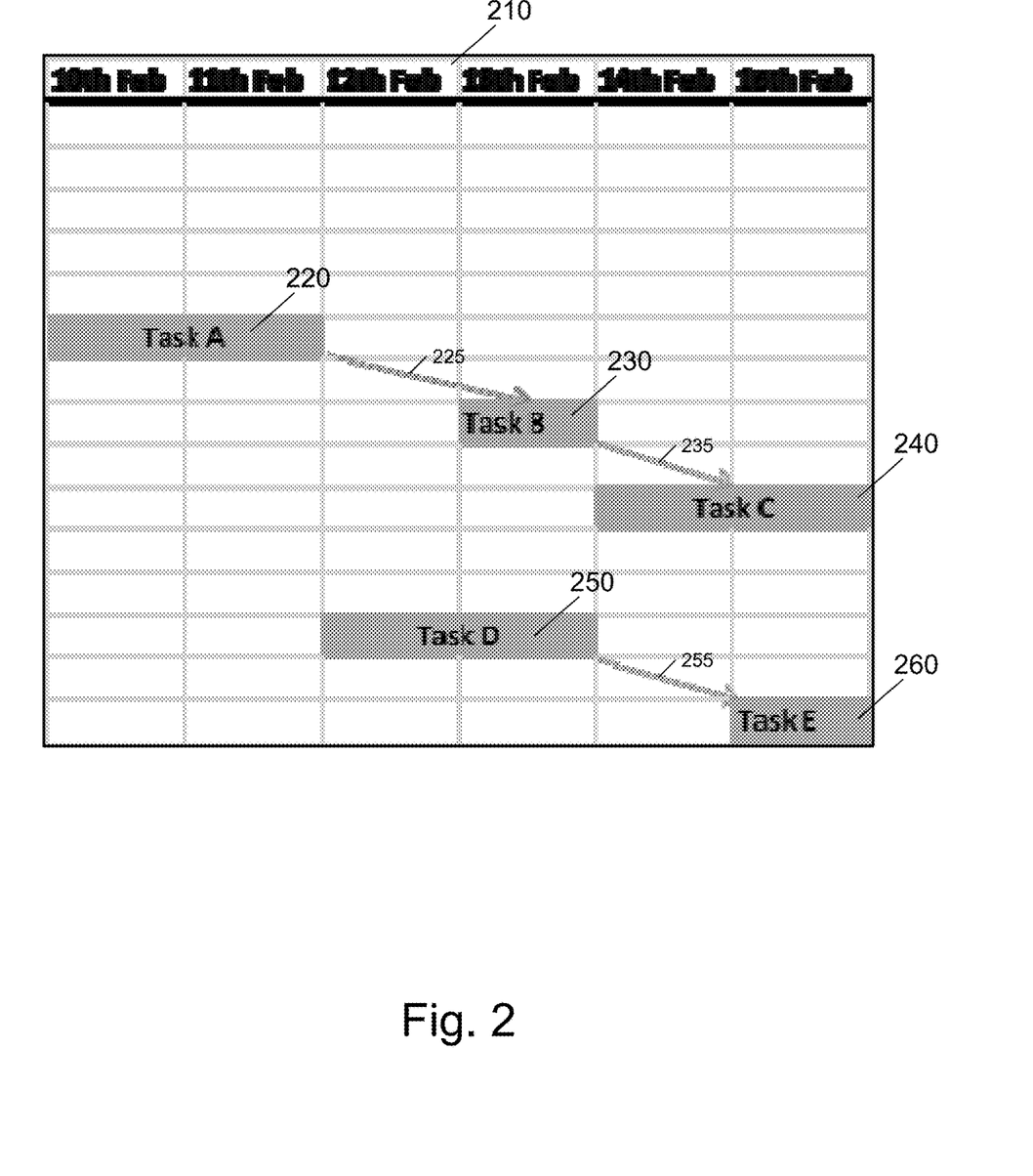
FIG. 2 illustrates a visual display of a Gantt chart within a user interface of a visual soft constraint system, where the visual display includes connectors, according to an embodiment of the invention.

FIG. 2 illustrates a visual display of a Gantt chart within a user interface of a visual soft constraint system, where the visual display includes connectors, according to an embodiment of the invention. The Gantt chart provides a view of a project. The project has a scheduled start date-time of February 10 (start-of-day), and a scheduled end date-time of February 15 (end-of-day). The visual soft constraint system further displays timeline 210 within the Gantt chart. Timeline 210 includes 6 time units: time units February 10-February 15. The visual resource soft constraint system further displays task indicators 220, 230, 240, 250, and 260 within the Gantt chart. Task indicator 220 corresponds to Task A, task indicator 230 corresponds to Task B, task indicator 240 corresponds to Task C, task indicator 250 corresponds to Task D, and task indicator 260 corresponds to Task E.

As previously described, two tasks within a project can be connected by an interdependency. Where two tasks are connected by an interdependency, a delay in a first task can result in a delay in a second task. As an example, a type of an interdependency is a task interdependency, where a start or finish of a successor task is dependent on a start or finish of a predecessor task. As previously described, a task interdependency is also identified as a hard constraint. A source of a delay in a task of a project can be captured in a Gantt chart when the interdependency is a task interdependency (i.e., when the source of the delay is a hard constraint).

In accordance with an embodiment, the visual soft constraint system displays connectors between the task indicators that represent hard constraints, such as task interdependencies. According to the illustrated embodiment, the visual soft constraint system displays connectors 225, 235, and 255. Connector 225 is a connector that is displayed between task indicators 220 and 230, and represents a task interdependency (more specifically, a finish-to-start interdependency) between Task A and Task B. Connector 235 is a connector that is displayed between task indicators 230 and 240, and represents a task interdependency (more specifically, a finish-to-start interdependency) between Task B and Task C. Connector 255 is a connector that is displayed between task indicators 250 and 260, and represents a task interdependency (more specifically, a finish-to-start interdependency) between Task D and Task E. As can be seen in the Gantt chart illustrated in FIG. 2, any delay of more than one day in Task A will also delay Task B and Task C, based on the task interdependency between Task A and Task B, and the task interdependency between Task B and Task C.

According to an embodiment, connectors 225, 235, and 255 are displayed using a first color (e.g., blue). This can indicate that Tasks A, B, and C are not on a critical path. Also according to the embodiment, connectors 225, 235, and 255 are displayed as solid lines. However, this is only an example embodiment, and in other alternate embodiments, connectors 225, 235, and 255 can be displayed using different formats.

In one embodiment, a shared resource R1 (not shown in FIG. 2) can be allocated for both Task A and Task D. While the Gantt chart illustrated in FIG. 2 captures the impact of a delay of Task A on both Task B and Task C, the Gantt chart does not capture the impact of a delay of Task A on Task D. Task A and Task D do not have any hard constraints (i.e., task interdependencies). However, a task interdependency is not the only type of interdependency. As previously described, another type of an interdependency is a resource interdependency, where a shared resource works on both tasks. As also previously described, a resource interdependency is also identified as a soft constraint. While Task A and Task D do not have any hard constraints, Task A and Task D do have a soft constraint. In other words, Task A and Task D have a resource interdependency, because both tasks have resource R1 allocated to them. Thus, any delay in Task A will impact Task D, and consequently, will impact Task E. For example, if Task A is delayed by 1 day, Task D will also get delayed by 1 day. This situation is further illustrated in FIGS. 3 and 4. However, the Gantt chart illustrated in FIG. 2 does not visually indicate the soft constraint between Task A and Task D. In an embodiment of the invention, the visual soft constraint system can visualize the soft constraint between Task A and Task D, as discussed below in greater detail in conjunction with FIG. 4.

Figure 3:
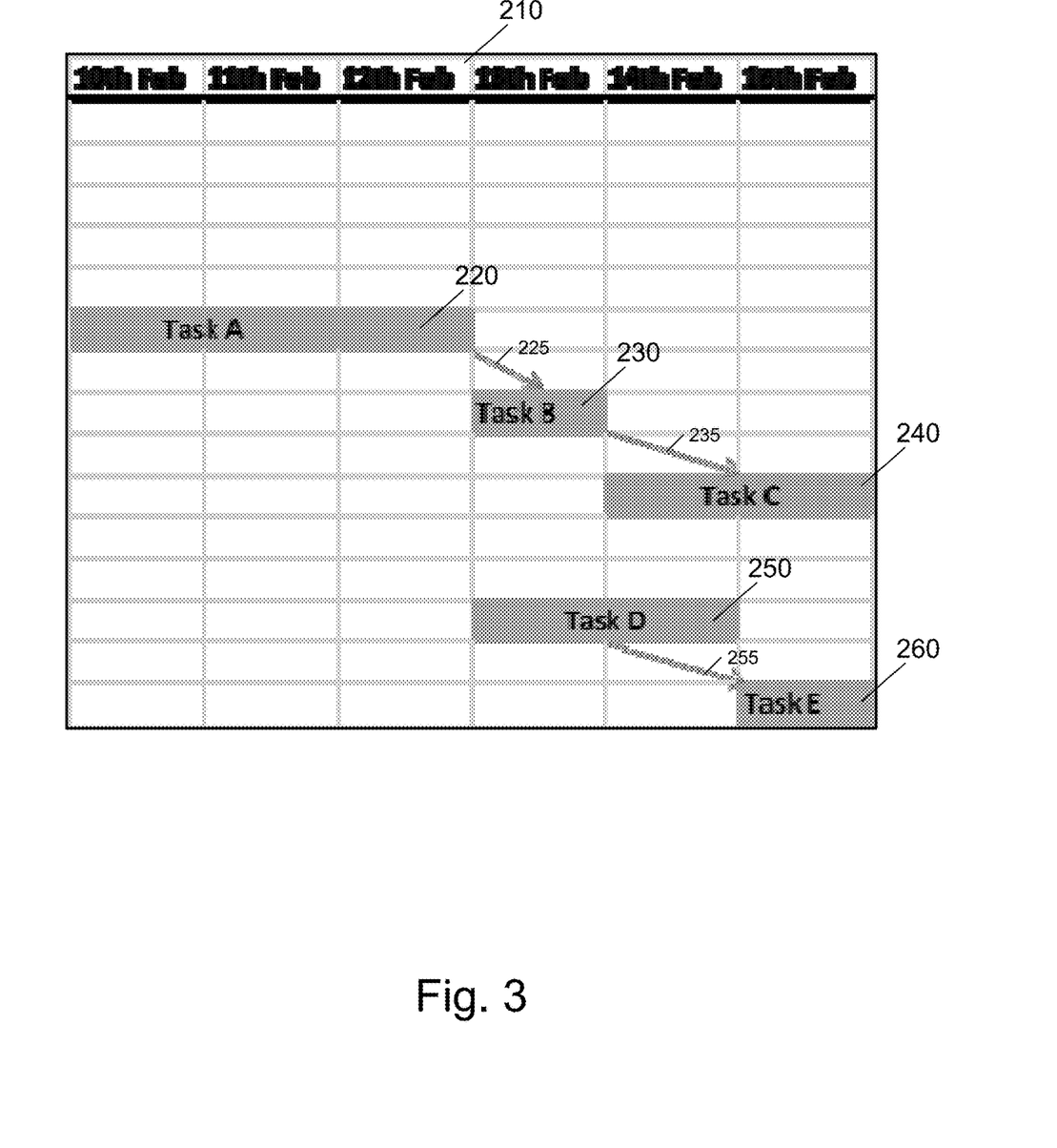
FIG. 3 illustrates a visual display of a Gantt chart within a user interface of a visual soft constraint system, where a task has been delayed, according to an embodiment of the invention.

FIG. 3 illustrates a visual display of a Gantt chart within a user interface of a visual soft constraint system, where a task has been delayed, according to an embodiment of the invention. Except as described below, the Gantt chart illustrated in FIG. 3 is identical to the Gantt chart illustrated in FIG. 2. In the illustrated embodiment, Task A has been delayed by 1 day, so that the end date-time of Task A is February 12 (end-of-day), rather than February 11 (end-of-day). Based on the delay of 1 day of Task A, the visual resource soft constraint system modifies task indicator 220 within the Gantt chart by increasing the width of task indicator 220, which reflects the delay. The delay of Task A by 1 day causes Tasks A, B, and C to be on a critical path. As previously described, a critical path is a path that includes a set of tasks connected by interdependencies, where the path spans across a timeline of a project. With the delay of 1 day of Task A, Task A has a start date-time of February 10 (start-of-day) and an end date-time of February 12 (end-of-day), Task B has a start date-time of February 13 (start-of-day) and an end date-time of February 13 (end-of-day), Task C has a start date-time of February 14 (start-of-day) and an end date-time of February 15 (end-of-day), and Tasks A, B, and C are connected by task interdependencies. Thus, the path of Tasks A, B, and C spans across timeline 210, and therefore, Tasks A, B, and C are on a critical path. In certain embodiments, the visual soft constraint system can modify a color of connectors 225 and 235 from a first color (e.g., blue) to a second color (e.g., red) to visually indicate the critical path.

The delay of Task A by 1 day also causes a delay of 1 day in Task D. This is because Task A and Task D have a soft constraint. More specifically, Task A and Task D have a resource interdependency based on the fact that a shared resource, resource R1, performs both Task A and Task D. Thus, Task D is also delayed by 1 day, so that the start date-time of Task D is February 13 (start-of-day), rather than February 12 (start-of-day), and the end date-time of Task D is February 14 (end-of-day), rather than February 13 (end-of-day). Based on the delay of 1 day of Task D, the visual resource soft constraint system modifies task indicator 250 within the Gantt chart by adjusting a position of task indicator 250, which reflects the delay. However, it is difficult to identify the reasons for the delay of Task D, because the Gantt chart illustrated in FIG. 3 does not visually indicate the soft constraint between Task A and Task D. Further, the delay of Task A by 1 day causes tasks A, D, and E to also be on a critical path. With the delay of 1 day of Task A, Task A has a start date-time of February 10 (start-of-day) and an end date-time of February 12 (end-of-day), Task D has a start date-time of February 13 (start-of-day) and an end date-time of February 15 (end-of-day), Task E has a start date-time of February 15 (start-of-day) and an end date-time of February 15 (end-of-day), Tasks A and D are connected by a resource interdependency, and Tasks D and E are connected by a task interdependency. Thus, the path of Tasks A, D, and E spans across timeline 210, and therefore, Tasks A, D, and E are on a critical path. However, because the Gantt chart illustrated in FIG. 3 does not visually indicate the soft constraint between Task A and Task D, the Gantt chart also does not visually indicate that Tasks A, D, and E are on a critical path. In an embodiment of the invention, the visual soft constraint system can visualize the soft constraint between Task A and Task D, and can further visualize the critical path that includes Tasks A, D, and E, as discussed below in greater detail in conjunction with FIG. 4.

Figure 4:
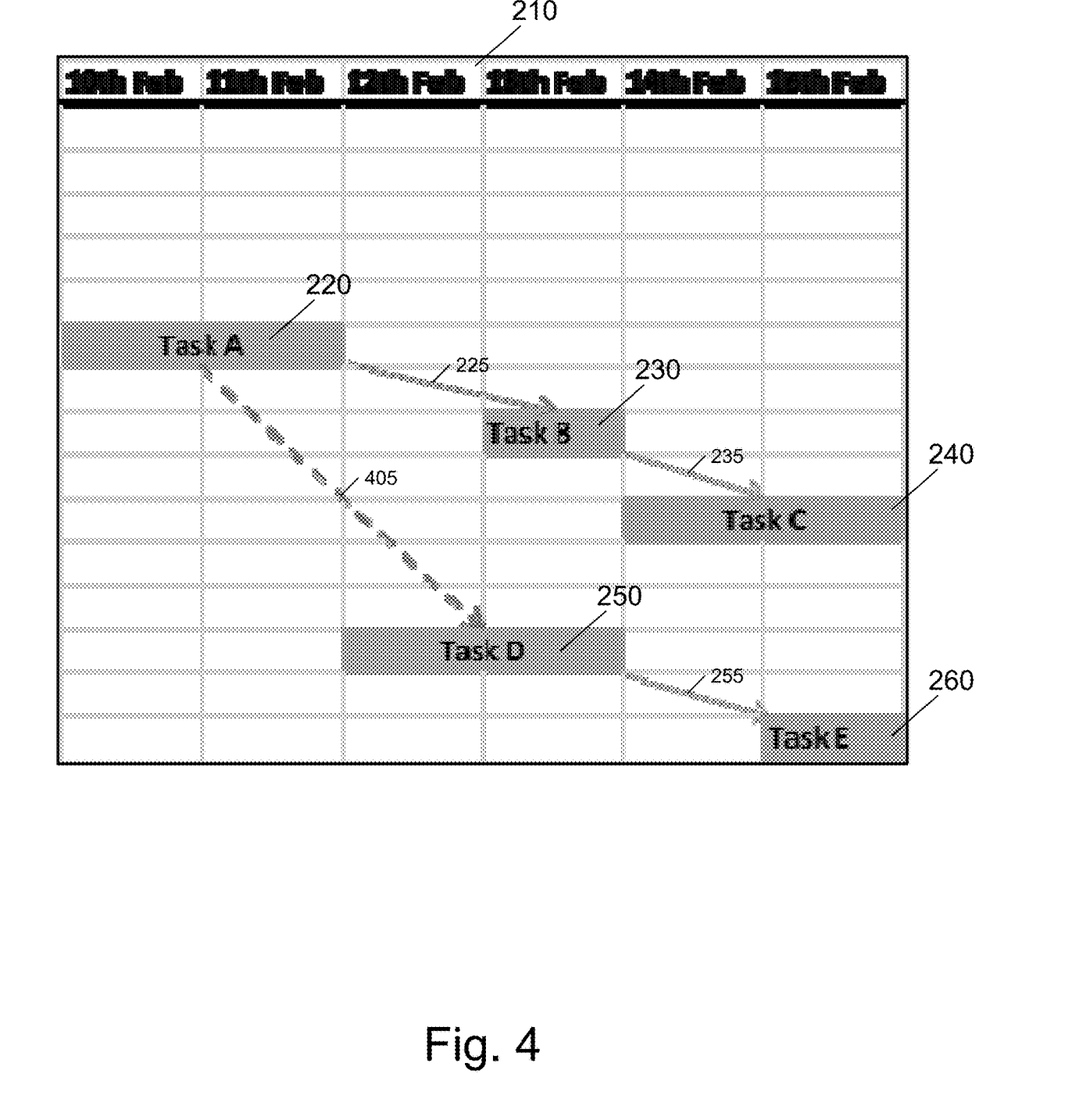
FIG. 4 illustrates a visual display of a Gantt chart within a user interface of a visual soft constraint system, where the visual display includes a soft connector, according to an embodiment of the invention.

FIG. 4 illustrates a visual display of a Gantt chart within a user interface of a visual soft constraint system, where the visual display includes a soft connector, according to an embodiment of the invention. Except as described below, the Gantt chart illustrated in FIG. 4 is identical to the Gantt chart illustrated in FIG. 2. In accordance with an embodiment, the visual soft constraint system displays soft connectors between the task indicators that represent soft constraints, such as resource interdependencies. According to the illustrated embodiment, the visual soft constraint system displays soft connector 405. Soft connector 405 is a soft connector that is displayed between task indicators 220 and 250, and represents a resource interdependency between Task A and Task D. As can be seen in the Gantt chart illustrated in FIG. 4, any delay in Task A will also delay Task D, based on the resource interdependency between Task A and Task D. Further, a delay in Task A of more than 1 day will not only delay Task D, but will place Tasks A, D, and E on a critical path. By displaying soft connector 405, the visual soft constraint system can provide visibility of this possibility to a project manager, and allow the project manager to take any corrective measures necessary in advance. Further, if Task A is delayed, and causes Task D to be delayed, by displaying soft connector 405, the project manager can determine the cause of the delay of Task D very easily.

According to an embodiment, soft connector 405 is displayed using a first color (e.g., blue). This can indicate that Tasks A, D, and E are not on a critical path. In an alternate embodiment, where Tasks A, D, and E, are on a critical path, the visual soft constraint system can modify a color of soft connector 405 from a first color (e.g., blue) to a second color (e.g., red) to visually indicate the critical path. Also according to the embodiment, soft connector 405 is displayed as a dashed line, rather than a solid line. This is to distinguish soft connector 405 from connectors 225, 235, and 255. However, this is only an example embodiment, and in other alternate embodiments, soft connector 405 can be displayed using a different format, where the format can either be automatically configured by the visual soft constrain system or manually configured by a user.

In an embodiment, the visual soft constraint system can automatically define a maximum delay duration that represents a maximum delay allowed in a predecessor task that has a soft constraint (such as a resource interdependency) with a successor task in order to display a soft connector within a Gantt chart. In an alternate embodiment, a user can manually define the maximum delay duration. When the maximum delay duration is defined, the visual soft constraint system can determine a minimum duration of a delay of a first task that also delays a second task, where the first and second tasks are task that have a soft constraint, such as a resource interdependency. The visual soft constraint system can further only display a soft connector between a first task indicator that represents the first task and a second task indicator that represents the second task when the minimum duration of a delay of the first task that also delays the second task is less than or equal to the maximum delay duration.

An example is provided to further describe the maximum delay duration. In this example, a project has a start date-time of Apr. 1, 2014 (start-of-day) and has an end date-time of Mar. 31, 2015 (end-of-day). The project consists of many tasks. The start and end date-times of four tasks in the project are as follows:

| Task Name | Start Date-Time | Finish Date-Time |
|---|---|---|
| Task A | Apr. 1, 2014 (start-of-day) | Apr. 5, 2014 (end-of-day) |
| Task B | Apr. 7, 2014 (start-of-day) | Apr. 9, 2014 (end-of-day) |
| . . . | . . . | . . . |
| Task C | Apr. 1, 2014 (start-of-day) | Apr. 5, 2014 (end-of-day) |
| Task D | Mar. 29, 2015 (start-of-day) | Mar. 31, 2015 (end-of-day) |

Further, a shared resource, resource R1, is the only resource allocated for Task A and Task B. Task A and Task B do not have a task interdependency, or any other type of hard constraint. However, because the same resource, resource R1, is allocated to both Task A and Task B, Task A and Task B have a resource interdependency, which is a type of soft constraint. Likewise, another shared resource, R2, is the only resource allocated for Task C and Task D. Task C and Task D do not have a task interdependency, or any other type of hard constraint. However, because the same resource, resource R2, is allocated to both Task C and Task D, Task C and Task D have a resource interdependency.

Any delay of more than 1 day in completion of Task A will also delay Task B. If a maximum delay duration is defined as 2 days (or any larger duration), the visual soft constraint system will display a soft connector between a task indicator that represents Task A and a task indicator that represents Task B. This is because a minimum duration of a delay of Task A that also delays Task B is less than the defined maximum delay duration (i.e., 2 days or more). If a maximum delay duration is defined as 1 day (or any smaller duration), the visual soft constraint system will not display a soft connector between a task indicator that represents Task A and a task indicator that represents Task B. This is because a minimum duration of a delay of Task A that also delays Task B is greater than the defined maximum delay duration (i.e., 1 day or less).

Any delay of more than 358 days in completion of Task C will also delay Task D. If a maximum delay duration is defined as 359 days (or any larger duration), the visual soft constraint system will display a soft connector between a task indicator that represents Task C and a task indicator that represents Task D. This is because a minimum duration of a delay of Task C that also delays Task D is less than the defined maximum delay duration (i.e., 359 days or more). If a maximum delay duration is defined as 358 days (or any smaller duration), the visual soft constraint system will not display a soft connector between a task indicator that represents Task C and a task indicator that represents Task D. This is because a minimum duration of a delay of Task C that also delays Task D is greater than the defined maximum delay duration (i.e., 358 or less).

Since, in the above example, it is very unlikely that, in a project of a duration of one year, a task will get delayed by more than 358 days, it is likely that a project manager desires to suppress a display of a soft connector between Tasks C and D. On the other hand, a delay of 2 days is highly likely in a project of a duration of one year. Thus, it is likely that a project manner desires to display a soft connector between Tasks A and B. By defining a maximum delay duration, the visual soft constraint system can provide such flexibility to the product manager. More generally, by defining a maximum delay duration, the visual soft constraint system can prevent the Gantt chart from being "cluttered" with soft connectors that represent soft constraints that are very unlikely to impact the overall product schedule.

Figure 5:
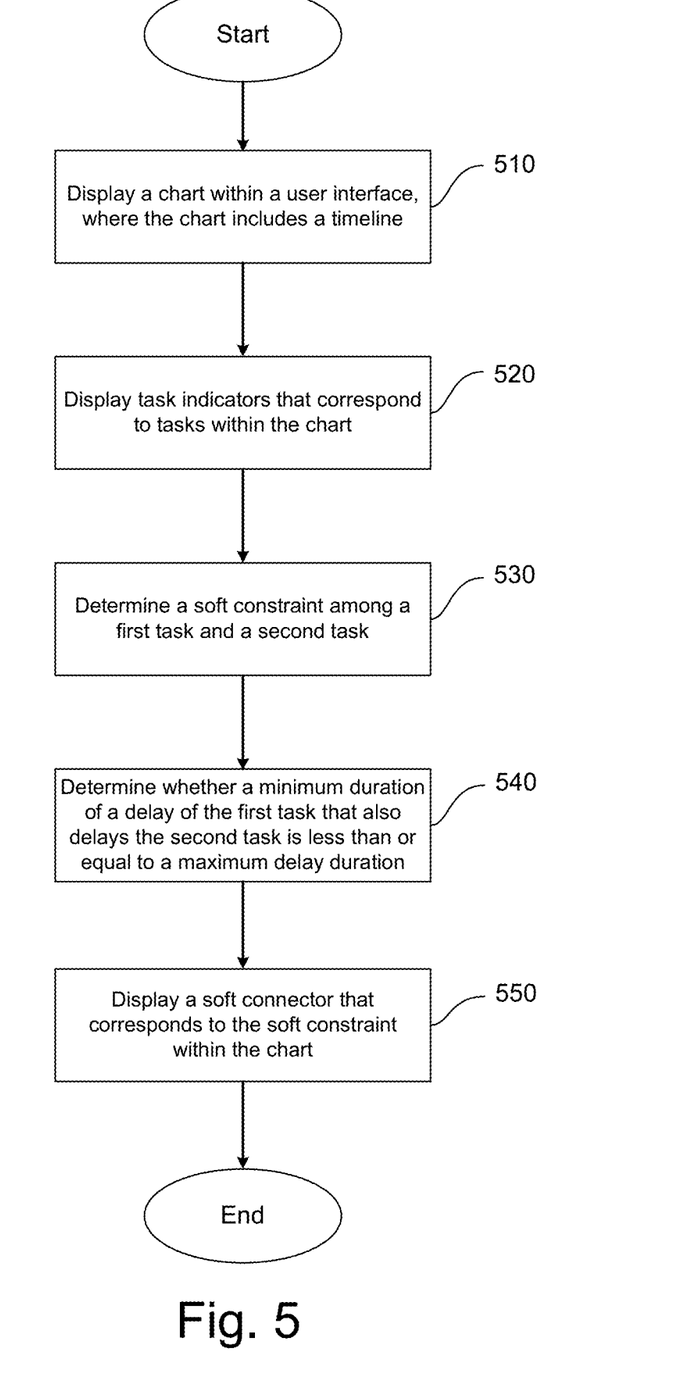
FIG. 5 illustrates a flow diagram of the functionality of a visual soft constraint module, according to an embodiment of the invention.

FIG. 5 illustrates a flow diagram of the functionality of a visual soft constraint module (such as visual soft constraint module 16 of FIG. 1), according to an embodiment of the invention. In one embodiment, the functionality of the flow diagram of FIG. 5 is implemented by software stored in a memory or some other computer-readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. In certain embodiments, some of the functionality can be omitted.

The flow begins and proceeds to 510. At 510, a chart is displayed within a user interface, where the chart includes a timeline including one or more time units. In certain embodiments, a time unit can be one of: a day, a week, a month, or a year. Further, in some embodiments, the timeline can be displayed with a top portion of the chart. In some of the embodiments, the chart is a Gantt chart. The flow then proceeds to 520.

At 520, a plurality of task indicators are displayed within the timeline of the chart. The plurality of task indicators correspond to a plurality of tasks. The plurality of tasks can be tasks of a project. In certain embodiments, a task indicator can be a bar. The flow then proceeds to 530.

At 530, a soft constraint among a first task and a second task of the plurality of tasks is determined. In certain embodiments, the soft constraint is a resource interdependency, where the first task and the second task are performed by a single resource. In some of these embodiments, the soft constraint can be determined by determining that the first task and the second task are performed by a single resource. The flow then proceeds to 540.

At 540, it is determined whether a minimum duration of a delay of the first task that also delays the second task is less than or equal to a maximum delay duration. In certain embodiments, the maximum delay duration is automatically defined. In other embodiments, the maximum delay duration is defined by a user. In certain embodiments where a maximum delay duration is not defined, this functionality can be omitted. The flow then proceeds to 550.

At 550, a soft connector that corresponds to the soft constraint is displayed within the timeline of the chart. In certain embodiments, the soft connector can connect a first task indicator (displayed within the timeline of the chart) that corresponds to the first task with a second task indicator (displayed within the timeline of the chart) that corresponds to the second task. In some of these embodiments, the first task indicator is a first bar, the second task indicator is a second bar, and the soft connector is a dashed line. Further, in some of the embodiments, the soft connector is displayed using a first color. In certain embodiments where a maximum delay duration is defined, the soft connector is only displayed within the timeline of the chart when the minimum duration is less than or equal to the maximum delay duration.

In some embodiments when the first task indicator, the second task indicator, and the soft connector represent a critical path, the first task indicator, the second task indicator, and the soft connector can be highlighted. In some of these embodiments, the soft connector is displayed using a second color that is different from the first color. The flow then ends.

Thus, a visual soft constraint system is provided that can extend the functionality and visual information contained in a Gantt chart. The visual soft constraint system can display a soft connector that represents a soft constraint, such as a resource interdependency, among tasks within a Gantt chart. This can allow a user, such as a project manager, to more easily identify delays that are caused by soft constraints, more easily identify the cause of such delays, and more easily take corrective measures in advance to reduce or prevent such delays. More specifically, a project manager can more easily identify delays of tasks and determine whether delays are caused by task interdependencies (or other types of hard constraints), or whether delays are caused by resource interdependencies (or other types of soft constraints). This can also allow a project manager to perform project management from a view of a Gantt chart with an aim of eliminating a critical path from a project. Allowing a project manager to more easily eliminate critical paths from projects can result in significant improvements over current resource allocation processes. Further, the visual soft constraint system can selectively only display soft connectors that represent soft constraints that are likely to impact an overall project schedule. By providing this flexibility, the visual soft constraint system does not overwhelm a project manager with unnecessary information.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to visualize soft constraints among tasks, the visualizing comprising:
    displaying a chart within a user interface, wherein the chart comprises a timeline comprising one or more time units;
    displaying a first task indicator that corresponds to a first task, a second task indicator that corresponds to a second task, and a third task indicator that corresponds to a third task within a timeline of the chart, wherein the displayed first task indicator, second task indicator, and third task indicator each indicate a start time and an end time for the corresponding first task, second task, and third task;
    determining a soft constraint between the first task and the second task based on a same resource, wherein,
        the soft constraint is configured to be relaxed based on a change in resources allocated to at least one of the first task or the second task,
        the soft constraint indicates that the same resource is configured to perform the first task and the second task, and
        the first task and the second task do not comprise a finish-to-start task interdependency between them;
    determining a minimum delay of the first task that results in a delay of the second task based on a difference between a finish time for the first task and a start time for the second task;
    automatically displaying, by a visual soft constraint system, a soft connector based on the soft constraint that connects the first task indicator with the second task indicator, wherein the soft connector is selectively displayed when the determined minimum delay is less than or equal to a threshold, wherein the threshold is automatically defined by the visual soft constraint system to control a degree of soft connector clutter within the chart;
    automatically adjusting, by the visual soft constraint system and based on a delay in completion of the first task and the soft constraint, the display of the first task indicator to indicate a delayed end time for the first task and the display of second task indicator to indicate a delayed start time and end time for the second task, wherein
        the delay to the first task and second task creates a critical path that includes the first task, the second task, and the third task, the critical path being based on the resource interdependency between the first task and the second task and a finish-to-start task interdependency between the second task and the third task, and
        the display of the soft connector is automatically updated to indicate the created critical path.

2. The computer-readable medium of claim 1, wherein the threshold is defined by a user.

3. The computer-readable medium of claim 1, wherein the soft constraint is configured to be relaxed by the visual soft constraint system when one or more resources are allocated to at least one of the first task or the second task.

4. The computer-readable medium of claim 1, wherein the soft connector comprises a dashed line.

5. The computer-readable medium of claim 1, wherein the first task indicator comprises a first bar and the second task indicator comprises a second bar.

6. The computer-readable medium of claim 1, the visualizing further comprising highlighting the first task indicator, the second task indicator, and the soft connector when the first task indicator, the second task indicator, and the soft connector represent a critical path.

7. The computer-readable medium of claim 6, wherein the soft connector is displayed using a first color, wherein the highlighting comprises displaying the soft connector using a second color that is different from the first color.

8. The computer-readable medium of claim 1, wherein the chart is a Gantt chart.

9. The computer-readable medium of claim 1, wherein the first task and the second task are part of a project comprising a plurality of tasks, and the critical path indicates that the soft constraint between the first task and the second task is a portion of a critical path that spans the duration of the project.

10. The computer-readable medium of claim 1, wherein the soft connector is not displayed by the visual soft constraint system when the determined minimum delay is greater than the threshold.

11. The computer-readable medium of claim 10, wherein
    a fourth task indicator that corresponds to a fourth task and a fifth task indicator that corresponds to a fifth task is displayed within the timeline,
    a second same resource is configured to perform the fourth task and the fifth task,
    a second minimum delay of the fourth task that results in a delay of the fifth task is determined based on a difference between a finish time for the fourth task and a start time for the fifth task,
    and a soft connector that connects the fourth task indicator to the fifth task indicator is not displayed by the visual soft constraint system based on the determined second minimum delay being greater than the threshold.

12. The computer-readable medium of claim 1, wherein,
    a hard connector that connects the second task indicator and the third task indicator is displayed based on the finish-to-start task interdependency, the displayed hard connector is different from the displayed soft connector; and
    the display of the hard connector is updated to indicate the created critical path.

13. A computer-implemented method for visualizing soft constraints among tasks, the computer-implemented method comprising:
    displaying a chart within a user interface, wherein the chart comprises a timeline comprising one or more time units;

displaying a first task indicator that corresponds to a first task, a second task indicator that corresponds to a second task, and a third task indicator that corresponds to a third task within a timeline of the chart, wherein the displayed first task indicator, second task indicator, and third task indicator each indicate a start time and an end time for the corresponding first task, second task, and third task;

determining a soft constraint between the first task and the second task based on a same resource, wherein, the soft constraint is configured to be relaxed based on a change in resources allocated to at least one of the first task or the second task, the soft constraint indicates that the same resource is configured to perform the first task and the second task, and the first task and the second task do not comprise a finish-to-start task interdependency between them;

determining a minimum delay of the first task that results in a delay of the second task based on a difference between a finish time for the first task and a start time for the second task;

automatically displaying, by a visual soft constraint system, a soft connector based on the soft constraint that connects the first task indicator with the second task indicator, wherein the soft connector is selectively displayed when the determined minimum delay is less than or equal to a threshold, wherein the threshold is automatically defined by the visual soft constraint system to control a degree of soft connector clutter within the chart;

automatically adjusting, by the visual soft constraint system and based on a delay in completion of the first task and the soft constraint, the display of the first task indicator to indicate a delayed end time for the first task and the display of second task indicator to indicate a delayed start time and end time for the second task, wherein the delay to the first task and second task creates a critical path that includes the first task, the second task, and the third task, the critical path being based on the resource interdependency between the first task and the second task and a finish-to-start task interdependency between the second task and the third task, and the display of the soft connector is automatically updated to indicate the created critical path.

14. The computer-implemented method of claim 13, wherein the soft constraint is configured to be relaxed by the visual soft constraint system when one or more resources are allocated to at least one of the first task or the second task.

15. The computer-implemented method of claim 13, further comprising highlighting the first task indicator, the second task indicator, and the soft connector when the first task indicator, the second task indicator, and the soft connector represent a critical path.

16. The computer-implemented method of claim 13, wherein the soft connector is not displayed by the visual soft constraint system when the determined minimum delay is greater than the threshold.

17. A system for visualizing soft constraints among tasks, the system comprising a processor configured to execute instructions stored on a non-transitory computer-readable medium to:

display a chart within a user interface, wherein the chart comprises a timeline comprising one or more time units;

display a first task indicator that corresponds to a first task, a second task indicator that corresponds to a second task, and a third task indicator that corresponds to a third task within a timeline of the chart, wherein the displayed first task indicator, second task indicator, and third task indicator each indicate a start time and an end time for the corresponding first task, second task, and third task;

determine a soft constraint between the first task and the second task based on a same resource, wherein, the soft constraint is configured to be relaxed based on a change in resources allocated to at least one of the first task or the second task, the soft constraint indicates that the same resource is configured to perform the first task and the second task, and the first task and the second task do not comprise a finish-to-start task interdependency between them;

determine a minimum delay of the first task that results in a delay of the second task based on a difference between a finish time for the first task and a start time for the second task;

automatically display, by a visual soft constraint system, a soft connector based on the soft constraint that connects the first task indicator with the second task indicator, wherein the soft connector is selectively displayed when the determined minimum delay is less than or equal to a threshold, wherein the threshold is automatically defined by the visual soft constraint system to control a degree of soft connector clutter within the chart;

automatically adjust, by the visual soft constraint system and based on a delay in completion of the first task and the soft constraint, the display of the first task indicator to indicate a delayed end time for the first task and the display of second task indicator to indicate a delayed start time and end time for the second task, wherein the delay to the first task and second task creates a critical path that includes the first task, the second task, and the third task, the critical path being based on the resource interdependency between the first task and the second task and a finish-to-start task interdependency between the second task and the third task, and the display of the soft connector is automatically updated to indicate the created critical path.

18. The system of claim 17, wherein the soft constraint is configured to be relaxed by the visual soft constraint system when one or more resources are allocated to at last one of the first task or the second task.

19. The system of claim 17, wherein the processor is further configured to execute the instruction to highlight the first task indicator, the second task indicator, and the soft connector when the first task indicator, the second task indicator, and the soft connector represent a critical path.

* * * * *